United States Patent [19]
Kollonitsch et al.

[11] 3,891,668
[45] June 24, 1975

[54] SYNTHESIS OF 1-SUBSTITUTED-2-(P-FLUOROPHENYL)-5-NITROIMIDAZOLES

[75] Inventors: Janos Kollonitsch; Alan N. Scott, both of Westfield; George A. Doldouras, Fanwood, all of N.J.

[73] Assignee: Merck & Co., Inc., Rahway, N.J.

[22] Filed: May 15, 1974

[21] Appl. No.: 470,237

Related U.S. Application Data

[63] Continuation-in-part of Ser. No. 289,498, Sept. 15, 1972, abandoned, which is a continuation-in-part of Ser. No. 40,448, May 25, 1970, abandoned.

[52] U.S. Cl.................................. 260/309; 424/273
[51] Int. Cl............................................ C07d 49/36
[58] Field of Search ...................................... 260/309

[56] References Cited
OTHER PUBLICATIONS

Dimroth et al., Angew. Chem. Internat. ed., 1966, Vol. 5, p. 676, QD1.Z51.

Graham et al., J. Org. Chem., 1969, Vol. 34, pp. 2589–2595, QD241.J6.

Kullick, Angew. Chem. Internat. ed., 1966, Vol. 5, pp. 675–676, QD1.Z51.

Meerwein et al., Liebigs Ann. Chem., 1960, Vol. 632, pp. 38–55, QD1.L7.

*Primary Examiner*—Natalie Trousof
*Attorney, Agent, or Firm*—Edmunde D. Riedl; J. Jerome Behan

[57] ABSTRACT

2-(p-Fluorophenyl)-1-alkyl or 1-(2′-hydroxyalkyl)-5-nitroimidazoles are prepared by reacting a chosen dialkoxy carbonium salt, or 1,3-dioxolenium salt with 2-(p-fluorophenyl)-4(5)-nitroimidazole. The compounds prepared are useful in the control of enterohepatitis in poultry, especially turkeys.

4 Claims, No Drawings

SYNTHESIS OF 1-SUBSTITUTED-2-(P-FLUOROPHENYL)-5-NITROIMIDAZOLES

RELATED U.S. APPLICATIONS

This application is a continuation-in-part of Ser. No. 289,498 filed Sept. 15, 1972 which is a continuation-in-part of application Ser. No. 40,448, filed May 25, 1970, which are both now abandoned.

This invention relates to new and novel processes for preparing 2-(p-fluorophenyl)-1-loweralkyl-5-nitroimidazole, and 2-(p-fluorophenyl)-1-(2'-hydroxyethyl)-5-nitroimidazole. These two processes involve reaction with the same starting material, 2-(p-fluorophenyl)-4(5)-nitroimidazole:

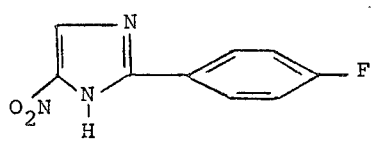 I

Both processes employ a different reagent, specifically chosen so that the desired loweralkyl of 1–6 carbon atoms, preferably methyl-, or ethyl-, or the 2-hydroxyethyl-group is substituted on the nitroimidazole in good yield.

It is, therefore, one object of this invention to provide processes for preparing 2-(p-fluorophenyl)-1-methyl (or ethyl, or 2'-hydroxyethyl)--hydroethyl)-5-nitroimidazole, each process yielding the desired end product.

The first process yields as its product:

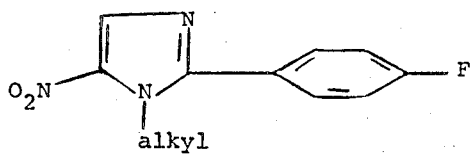 II

Preferably, the alkyl group is a loweralkyl group having 1–6 carbon atoms. More preferably, the 1-methyl-2-(p-fluorophenyl)-5-nitroimidazole is the final product.

The reagent used to prepare the above nitroimidazole II is a dialkoxy-carbonium fluoroborate, or a dialkoxycarbonium hexachloro(or fluoro)antimonate, which can be represented by the following formula:

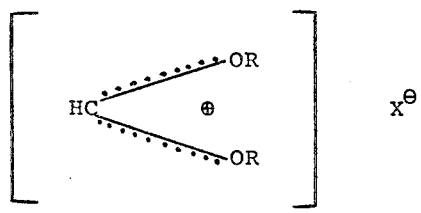 III wherein R is loweralkyl having 1–6 carbon atoms, preferably methyl, and X⁻ is $BF_4^-$, $SbCl_6^-$, or $SbF_6^-$.

The second process yields as its product:

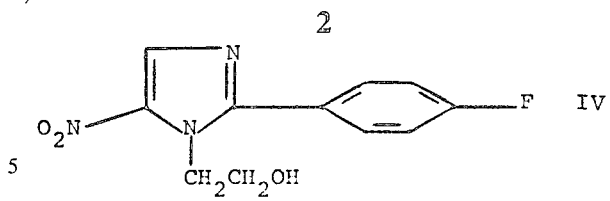 IV

This product is 1-(2'-hydroxyethyl)-2-(p-fluorophenyl)-5-nitroimidazole.

The reagent used to prepare the above nitroimidazole IV is a 1,3-dioxolenium salt of the formula:

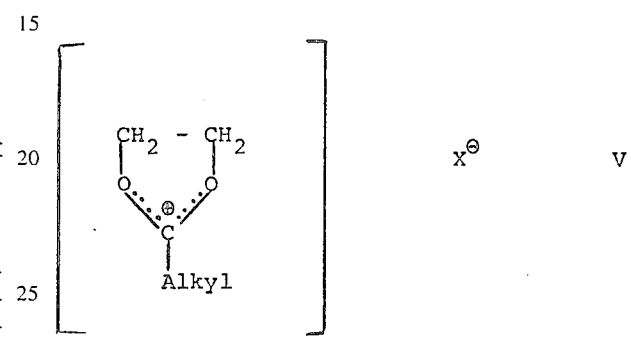 V wherein X⁻ is $BF_4^-$ or $SbCl_6^-$, or $SbF_6^-$, and alkyl has 1–6 carbon atoms.

The preparation and description of both reagents used in the processes of this invention is in Liebigs-.Ann., Vol. 632, pp. 38–55 (1960). The salts can be prepared following the general instructions, isolated, and then added to the starting material I. The salts can also be prepared in situ.

The preparation of the dialkoxy-carbonium salts can be generally described as follows: approximately 5 moles of a trialkyl orthoformate and 4 moles of boron trifluoride etherate, or 6 moles of antimony pentachloride or 6 moles of antimony pentafluoride are mixed to yield approximately 3 moles of the dialkoxy-carbonium salt. The reaction is conducted in the presence of a non-reactive solvent at a temperature of –60°C. to 20°C. After aging, (4–12 hours if the salt is to be isolated, under 1 hour if the salt is to be used in situ), the product can be either isolated in crystalline form or used without further treatment in the reaction. Preferably, trimethyl orthoformate and $BF_3$ in a diethyl ether solution is used. The 1,3-dioxolenium salts can be prepared by mixing boron trifluoride, antimony pentachloride, or antimony pentafluoride with 2-alkoxy-2-alkyl-1,3-dioxolane or 1-acetoxy-2-alkoxy-ethane, the alkoxy group in both cases having 1–6 carbon atoms, and preferably being ethoxy. The molar ratio of the inorganic salt to the organic compound is approximately 4–6:3, as in the preparation of the diakoxy-carbonium salts. The 1,3-dioxolenium salts are prepared by mixing the reagents and aging and isolating or using in situ in the further reaction.

Both the alkylating and hydroxyethylating process employ an inert solvent in the reaction. The term inert solvent is meant to include those solvents which is a solvent for all reactants and products, but does not enter into reaction either with reactants or products, or itself. Such inert solvents are found among those solvents that have a chemical structure which excludes protons bonded or any nitrogen or oxygen atoms thereof and which are not susceptible to alkylation or hydroxyethylation by the reagents employed. It is a simple matter for one skilled in the art to select a potential solvent and ascertain its inertness by experimentally determining its reactivity under reaction conditions with the dialkylcarbonium salt. If unreactive with this salt, the solvent is most likely inert and can be tried with every likelihood of success in the full-scale reaction. Suitable classes of solvents include ethers including polyethers, haloalkanes, including polyhaloalkanes and esters. Examples of prepared solvents include 1,2-dimethoxyethane, 1,2-dichloroethane, dioxane, methylene chloride, ethyl acetate, methyl formate, or 1,2-diacetoxyethane. The reactants are combined such that for each mole of imidazole employed from 1 to 5 moles of the alkylation or hydroxyethylation reagent is used. Generally, the reactants are mixed together in the chosen solvent initially at a temperature of from about −10° to 10°C. and then the reaction temperature is raised to from about 40° to 100°C. or to the reflux temperature of the reaction mixture if it is higher. The reaction is maintained within this temperature range for from 5 minutes to 10 hours with higher temperatures requiring shorter reaction times. The solvent is then removed and the residue worked up by techniques known to one skilled in this art affording the product.

The compounds prepared in the processes of this invention are useful in the control of enterohepatitis in turkeys. For this purpose, they may be administered to turkeys mixed with an element of turkey sustenance, e.g., feed or drinking water. Good control of enterohepatitis is obtained when 1-methyl or 1-(2'-hydroxyethyl)-2-(p-fluorophenyl)-5-nitroimidazole is incorporated in a turkey feed ration at a level from about 0.003 percent to about 0.1 percent by weight and preferably from about 0.006 percent to 0.05 percent by weight of the feed. The optimum concentration will depend to a large extent on the age of the bird, severity of the infection, and the particular compound employed. With the above feed levels, good control of the disease is obtained with no or minimal side effects or growth retardation of the turkeys.

The following examples illustrate the invention.

EXAMPLE 1

1-(2'-Hydroxyethyl)-2-(p-Fluorophenyl)-5-Nitroimidazole

The reagent, 2-methyl-1,3-dioxolenium hexachloroantimonate is first prepared. To a solution of 26.4 g. of 1-acetoxy-2-ethoxyethane in 30 ml. of 1,2-dichloroethane is added a solution of 65.8 g. of $SbCl_5$ in 30 ml. of 1,2-dichloroethane. The mixture is kept at the temperature of a dry ice-acetone bath during the addition, lasting about 20 minutes. After the addition, the mixture is left at room temperature overnight. Crystallization of the desired product is initiated, and the supernatant liquid removed by filtration. After washing, the crystals are dried to yield the desired 2-methyl-1,3-dioxolenium hexachloroantimonate.

13 G. of the salt reagent are dissolved in 15 ml. of 1,2-diacetoxyethane. This solution is added to a second solution of 4.14 g. of 2-(p-fluorophenyl)-4(5)-nitroimidazole in 5 ml. of 1,2-diacetoxyethane. The mixture is stirred at ambient temperature under an inert gas (nitrogen) for 2 hours. The temperature of the mixture is then raised to 50°–60°C. for 2 ½ hours while stirring; then 3N aqueous HCl is added and the mixture boiled under reflux for 1 hour, cooled to room temperature, and aqueous $NH_4OH$ added. The separated $Sb_2O_5$ is removed by filtration, and the liquid layers are separated. The aqueous phase is extracted with butyl acetate. The butyl acetate extracts are then extracted with aqueous $NH_4OH$ and 3N HCl. The pH of the HCl extracts are adjusted to pH 6, and the separated crystals are filtered and dried in vacuo. The product, 1-(2'-hydroxyethyl)-2-(p-fluorophenyl)-5-nitroimidazole, has a melting point of 163°–165°C.

Employing 2-methyl-1,3-dioxolenium tetrafluoroborate instead of the hexachloroantimonate salt, the same product, 1-(2'-hydroxyethyl)-2-(p-fluorophenyl)-5-nitroimidazole, m.p. 163°–165°C., is obtained.

EXAMPLE 2

1-Methyl-2-(p-Fluorophenyl)-5-Nitroimidazole 5.2 G. of 2-(p-fluorophenyl)-4(5)-nitroimidazole, 10.9 ml. of trimethyl or the formate, and 15 ml. of methyl formate are added to the reaction flask, and cooled to 0°–5°C. 12.6 Ml. of $BF_3$-diethyl ether complex is then added so that the temperature does not exceed 5°C. After addition is complete, the mixture is a clear homogeneous amber solution. After stirring for about 15–30 minutes, the temperature is raised to 50°C. to distill the methyl formate and the ether.

To the evaporated reaction mixture is added under vigorous stirring, 20 ml. of water, 30 ml. of butyl acetate and 20 ml. of concentrated $NH_4OH$. The temperature is kept within 25°–30°C. The butyl acetate layer is decanted and the aqueous portion is extracted with additional quantities of butyl acetate. The butyl acetate extracts are combined and extracted with 4N $NH_4OH$. Then the butyl acetate extract is further extracted with 3N HCl. The product is isolated from the HCl extract by first adjusting the pH to 6–7 by addition of 25 percent NaOH aqueous. The solution is then stirred into an ice bath for one hour. The product is collected and washed. The crude product is recrystallized from boiling ethyl acetate, and is collected as light yellow needles, m.p. 169°–172°C., identified as 1-methyl-2-(p-fluorophenyl)-5-nitroimidazole.

What is claimed is:

1. A process for alkylating 2-(p-fluorophenyl)-4(5)-nitroimidazole which comprises reacting in a solvent free from protons bonded to any oxygen or nitrogen atoms of said solvent, at a temperature of from −10°C. to the reflux temperature of the solvent employed, one molar equivalent of 2-(p-fluorophenyl)-4(5)-nitroimidazole with from 1–5 molar equivalents of a dialkoxycarbonium salt of the formula:

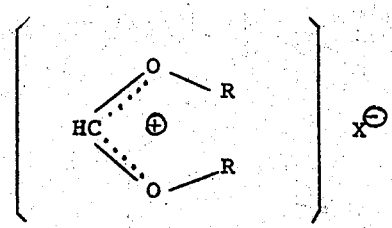

wherein R is loweralkyl of from 1–6 carbon atoms and $X^-$ is $BF_4^-$, $SbCl_6^-$, or $SbF_6^-$.

2. A process of claim 1 in which R is methyl.
3. A process of claim 1 in which $X^-$ is $BF_4^-$.
4. A process of claim 1 in which the solvent employed is 1,2-dimethoxyethane, 1,2-dichloroethane, dioxane, methylene chloride, ethyl acetate, methyl formate, or 1,2-diacetoxyethane.

* * * * *